Jan. 14, 1930.  H. P. HOLLNAGEL  1,743,776
MOTION DAMPING MEANS
Filed Feb. 1, 1924  2 Sheets-Sheet 1
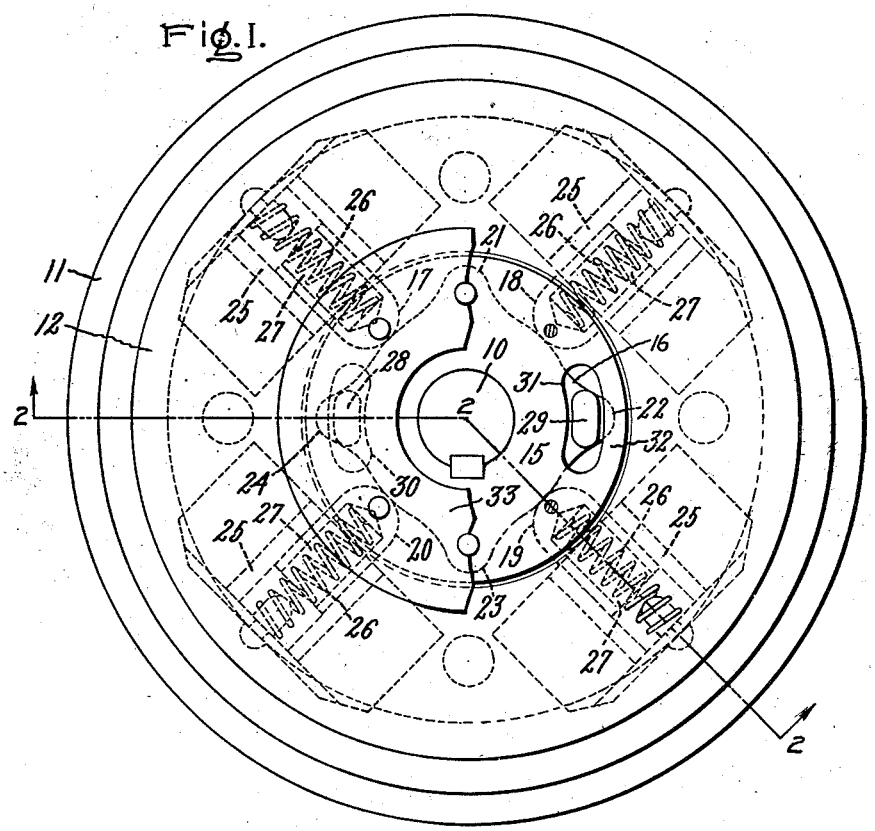
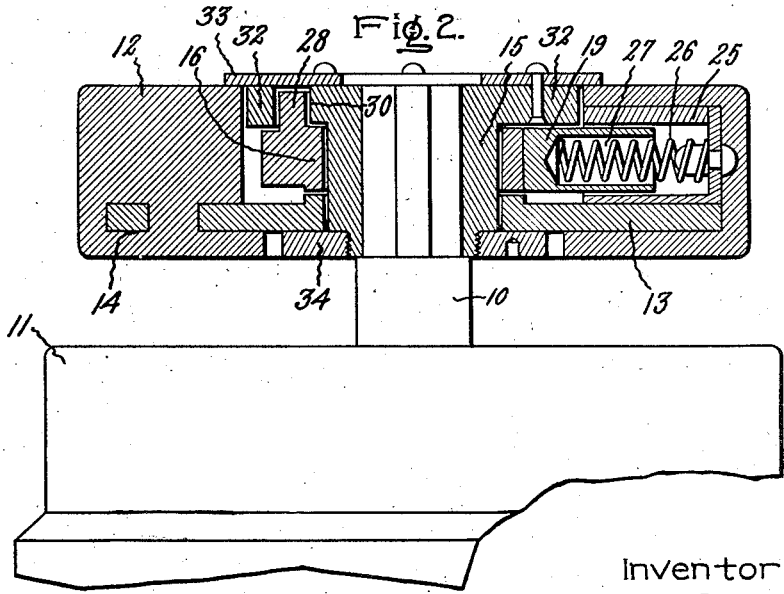
Inventor:
Herbert P. Hollnagel,
by *Alexander S. Lunt*
His Attorney.

Jan. 14, 1930.   H. P. HOLLNAGEL   1,743,776
MOTION DAMPING MEANS
Filed Feb. 1, 1924   2 Sheets-Sheet 2
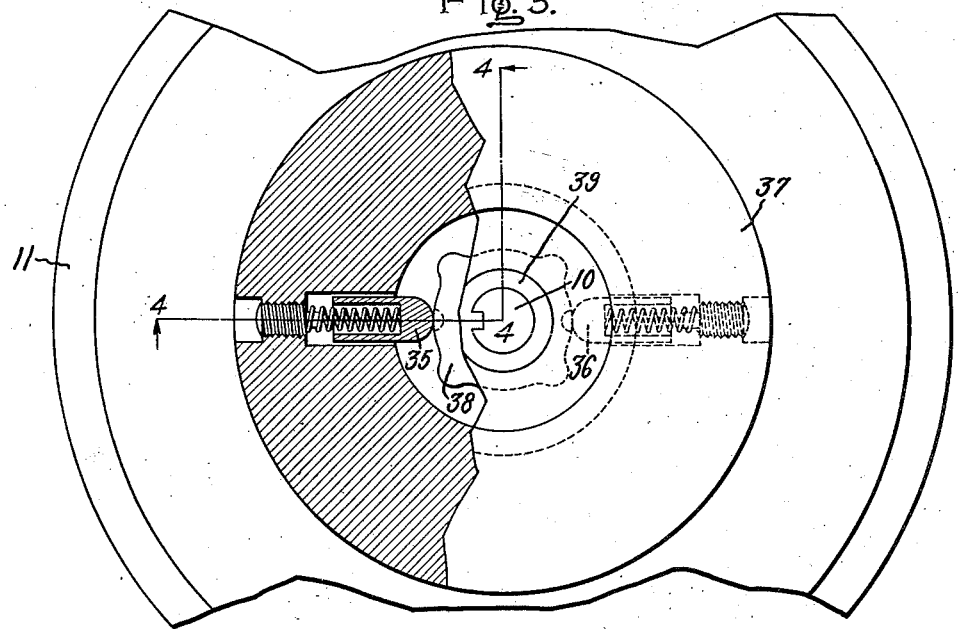
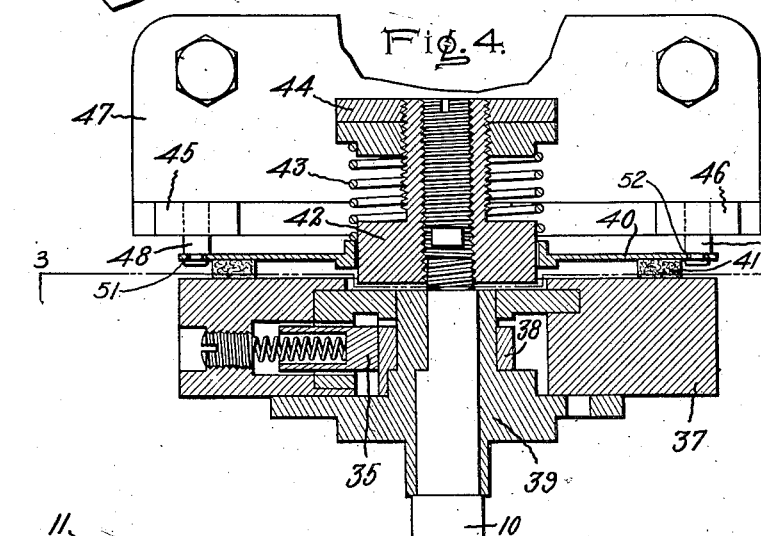
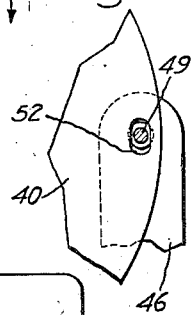
Inventor:
Herbert P. Hollnagel,
by
His Attorney.

Patented Jan. 14, 1930

1,743,776

UNITED STATES PATENT OFFICE

HERBERT P. HOLLNAGEL, OF SWAMPSCOTT, MASSACHUSETTS, ASSIGNOR TO GENERAL ELECTRIC COMPANY, A CORPORATION OF NEW YORK

MOTION DAMPING MEANS

Application filed February 1, 1924. Serial No. 690,101.

My invention relates to means for damping members having intermittent motion, and has for its object the provision of means for damping or checking the acceleration of such members as well as their tendency to oscillate in coming to rest.

My invention has application in the damping of moving members in general, although it has particular application in the damping of members having intermittent rotary motion. It may be used, for example, in connection with the rotor of a reproducer or receiver of angular motion. In certain types of receivers of angular motion, the rotor of the receiver in moving from one position to the next may accelerate to such speed as to operate as a synchronous motor. Under these conditions the receiver is obviously useless. Also, the rotor may, and usually does go through a series of oscillations at the end of each movement before finally coming to rest. These oscillations are due to the inertia of the rotor and other parts connected to it. In case the rotor is connected to drive an indicating member, such as a dial, the indicating member will, of course, oscillate with the rotor so that an accurate reading cannot be taken during the period of oscillation, which may mean an appreciable delay. Moreover, in the event of a series of movements in rapid succession, the indicating member might not come to rest to permit the taking of a reading for a considerable interval. Obviously, this tendency to oscillate is a serious disadvantage where time is an important factor.

In carrying out my invention, I provide a damping or inertia body which is connected to the moving member through a yieldable connection comprising a cam and spring pressed members associated with the cam in which energy is dissipated upon reaction with the inertia body so as to check the acceleration of the moving member and also its tendency to oscillate.

For a more complete understanding of my invention reference should be had to the accompanying drawings in which Fig. 1 is a fragmentary end elevation view of a damping means embodying my invention; Fig. 2 is a sectional view of Fig. 1 taken along the line 2—2 looking in the direction of the arrows; Fig. 3 is a sectional view along the line 3—3 of Fig. 4 looking in the direction of the arrows of a modified form of my invention; Fig. 4 is a sectional view along the line 4—4 of Fig. 3, looking in the direction of the arrows; while Fig. 5 is a fragmentary view showing details of construction.

Referring to Figs. 1 and 2 of the drawings, I have shown my invention in one form as applied to the rotor shaft 10 of a suitable instrument 11 for receiving or reproducing angular motion. My invention obviously has application, however, to various other moving members. The reproducer or receiving device 11 may be of any suitable type. For example, it may be an alternating current type comprising a polycircuit armature winding with a field winding supplied with alternating current rotatably associated therewith.

In one form of my invention the damping means for the rotor shaft 10 comprises a heavy fly wheel rim or inertia body 12 provided with a ring or washer shaped supporting member 13. The weighted rim 12 may conveniently be formed of lead or other suitable material which may be cast on the supporting member 13, suitable apertures 14 being provided in the supporting member so as to securely anchor the rim thereto. The supporting member 13 is rotatably mounted on a sleeve 15 secured to the rotor shaft 10, the sleeve 15 extending through a central aperture in the member 13 and forming a bearing therefor.

The rim 12 is operatively connected to the shaft 10 through a yieldable coupling or connection comprising a cam member 16 rotatably mounted on the sleeve 15, and rectangular spring pressed plungers 17, 18, 19 and 20 carried by the fly wheel rim 12. Four projections forming cams 21, 22, 23 and 24 are provided on the member 16. These cams are equally spaced about the shaft 10 as a center and are situated equal distances from the shaft. Midway between the cams are short sections taking the form of arcs described about the axis of rotation of the shaft 10. The plungers normally come to rest on these arc shaped sections as shown in Fig. 1. The plungers 17 to 20 inclusive are similarly constructed. They are mounted to be slidable in a radial direction in suitable guides 25 which may, for example, be cast in the fly wheel rim 12. The plungers are forced inwardly against the cam by means of helical springs 26 seated in recesses 27 in the plungers and bearing against the outer ends of guides 25. The inner ends of the plungers bearing on the cam member 16 are suitably rounded off in the plane of the cam member as shown.

A lost motion connection shown as a pin and slot connection, permitting a limited amount of independent angular motion is provided between the cam member 16 and the shaft 10. The cam member is provided with two diametrically opposite laterally extending pins 28 and 29 which are free to move in arc shaped slots 30 and 31 provided in a flange 32, forming a part of the sleeve 15. The shaft 10 thus has a limited amount of angular freedom independent of the weighted rim 12. A cover plate 33 is provided to tightly enclose the parts. The various parts are secured between flange 32 and nut 34 screwed on the lower end of sleeve 15 and suitably locked thereto.

The operation of the damping device is as follows: Assuming a considerable angular movement is to be reproduced by the rotor shaft 10, after the pins 28 and 29 have moved through the amount of freedom permitted by slots 30 and 31, the rotor will suddenly engage the inertia body or rim 12 whereby a certain amount of its energy of rotation is immediately dissipated in the cam and plunger connection. This has the effect of retarding the otherwise rapid acceleration of the rotor so that it is prevented from reaching a speed high enough to operate as a synchronous motor. After this check in acceleration the rotor will carry the rim around with it. The rotor, however, after executing the required angular movement will over-run due to its own inertia and the inertia of any parts which may be connected to it. When the rotor over-runs, it will be understood that a torque tending to turn it back is applied to it by virtue of the electromagnetic characteristics of the device, which torque rapidly increases with the angle through which the rotor over-runs. The result is that the rotor, if not provided with oscillation damping means, would go through a series of oscillations from one side to the other of the position of rest before finally coming to rest in this position. When using my invention, however, a considerable amount of the energy of rotation stored in the rotor and other parts rotating with it is dissipated at each reversal of oscillation, due to reaction with the weighted rim, in the cam and plunger connection between the rim 12 and the rotor shaft 10. Thus as the rotor reverses its rotation at the end of each oscillation, it will of course reverse the rotation of the weighted rim 12 and in so doing will cause the plungers to ride up on the cam projections 21 to 24 inclusive. In fact, during the first one or two vigorous reversals the plungers may pass completely over one or more of the projections. A relatively great amount of the stored up energy of the rotor is thus dissipated at each reversal with the result that the rotor and incidentally the weighted rim are brought to rest very quickly and after a very few oscillations. When the parts come to rest, the plungers seek a position between the cam projections as shown in Fig. 1.

Besides taking part in checking the acceleration of the rotor, as previously explained, the pin and slot connection gives the rotor a chance to start back at the end of each oscillation independently of the weighted rim. This is particularly true when the amplitude of the oscillations is but little greater than the length of the slots. The rotor thus gains a certain amount of kinetic energy of rotation in the opposite direction before the pins reach the opposite extremities of their slots and the rotor again engages the rim. This energy of rotation is immediately dissipated in the plunger and cam connection.

In the modified form of my invention shown in Figs. 3, 4 and 5, two spring pressed plungers 35 and 36 diametrically opposite each other are provided in the weighted rim 37 acting on the cam member 38. The plungers and cam member are similar in construction to the plungers and cam members shown in Figs. 1 and 2. The cam member 38 however, is rigidly secured on a sleeve 39 which is secured in turn to the shaft 10 so that the cam member turns with the shaft 10 at all times. Cooperating with the outer face of the weighted rim 37 is a stationary friction brake comprising a disc shaped member 40 carrying a ring 41 of suitable brake material, such as felt or asbestos. The member 40 is supported on a nut 42 secured to the end of shaft 10 and is forced inward, so as to cause the brake ring 41 to bear on the weighted rim, by means of a helical spring 43 cooperating with member 40 and having its other end resting against a nut 44 secured to nut 42. Rotation of the brake member 40 with the flywheel rim is prevented by means of two upright members 45 and 46 having a base 47 by means of which the uprights are secured in fixed position, whereby the disc exerts a braking action upon the flywheel rim. On the upper ends of the upright members are pins 48 and 49 which extend through slightly elongated apertures 51 and 52 (Fig. 5) in the member 40 on each side of nut 42 so as to hold the member 40 against rotation with the exception of the small amount of movement permitted by the freedom of pins 48 and 49 in the apertures.

In the operation of this form of my invention, the cam and plunger connection operates to dissipate the energy stored in the rotor in the same manner as described in connection with Figs. 1 and 2. Additional energy is dissipated by means of the friction brake cooperating with the rim 37 so that the rotor is brought to rest more quickly. This form is particularly useful where the size of the weighted rim is limited and where the rotor of the receiving device has itself relatively a large mass or has parts of relatively large mass connected to it. The slots 51 and 52 are elongated but a small amount so that the friction brake is effective to damp out oscillations of small amplitude, as well as to check the acceleration of the rotor as described in connection with the forms shown in Figs. 1 and 2. Also, since the cam member 38 is secured to the rotor shaft 10, there will be relative movement of the cam member and plungers for small oscillations and hence dissipation of energy with resultant damping action. This form of my invention is therefore, particularly adapted to damp out oscillations of small amplitude.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States is:—

1. Damping means for a moving member comprising an inertia body, and a driving connection between said body and said member including means providing for limited relative movement between them together with energy dissipating means comprising a cam and a yieldable member cooperating with said cam, said cam and yieldable member being operably associated with said inertia body and said member so that said inertia body is driven by said member, and energy is dissipated upon reaction between said inertia body and said member.

2. Damping means for a moving body comprising an inertia body, a driving connection between said bodies including means providing for limited relative movement between them together with energy dissipating means comprising a cam shaped member and a spring pressed member cooperating with said cam shaped member, one of said members being operably associated with said moving body so as to be actuated thereby and the other being connected to said inertia body whereby said inertia body is driven by said moving body, said energy dissipating means being arranged to dissipate energy upon reaction between said moving body and said inertia body.

3. Damping means for a member having intermittent rotary motion comprising an inertia member rotatably mounted on said moving member, a cam, a driving connection between said cam and one of said members providing for limited relative movement between them, and an energy dissipating driving connection between said cam and the other member comprising a yieldable member carried by said other member and cooperating with said cam.

4. Damping means for a member having rotary motion comprising an inertia body rotatably mounted on said member, a second body rotatably mounted on said member, a driving connection between said second body and said member providing for limited relative movement between them, and an energy dissipating driving connection between said second body and said inertia body comprising a plurality of circumferentially spaced projections on one of said bodies and yieldable members cooperating with said projections and carried by the other of said bodies whereby said inertia body is driven by said member, said driving connection being arranged to dissipate energy upon reaction between said inertia body and said member.

5. Damping means for a member having intermittent rotary motion, comprising a cam carried by said member, a driving connection between said cam and said member providing for limited relative movement between them, an inertia body rotatably mounted on said member, and yieldable members carried by said body cooperating with said cam whereby said inertia body is driven by said member, said yieldable members moving with relation to said cam to dissipate energy upon relative change in the velocities of said member and said body.

6. Damping means for a member having intermittent rotary motion, comprising a cam, a pin and slot connection between said cam and said member, an inertia body rotatably mounted on said member, and spring pressed plungers carried by said body frictionally bearing on said cam so as to dissipate energy upon relative movement therewith.

7. The combination with a reproducer of angular motion of means for checking the acceleration of the rotor of said reproducer and for checking oscillations thereof in coming to rest, comprising a heavy flywheel rim rotatably mounted on said rotor, a disc having circumferentially spaced radially extending projections mounted on said rotor, a lost motion driving connection between said disc and said rotor providing for limited relative movement thereof, and spring pressed radially disposed plungers carried by said flywheel rim bearing on said disc and moving over said projections to dissipate energy upon a relative change in the angular velocities of said rotor and flywheel rim.

8. The combination with a reproducer of angular motion of means for checking the acceleration of the rotor of said reproducer and for checking oscillations thereof in coming to rest, comprising a heavy flywheel rim constituting an inertia mass rotatably mounted on the rotor shaft, a disc like cam member rotatably mounted on the rotor shaft, a plurality of radialy projecting circumferentially spaced projections on said cam member, a pin and slot connection between said shaft and said cam member, and a plurality of spring pressed radially disposed plungers carried by said flywheel rim having their inner ends frictionally bearing upon said cam member so as to dissipate energy upon relative movement therewith.

In witness whereof, I have hereunto set my hand this 28th day of January, 1924.

HERBERT P. HOLLNAGEL.